(12) United States Patent
Kaneko et al.

(10) Patent No.: US 7,916,688 B2
(45) Date of Patent: Mar. 29, 2011

(54) METHOD FOR TRANSMITTING/RECEIVING DATA IN COMMUNICATION SYSTEM

(75) Inventors: Megumi Kaneko, Aalborg (DK); Petar Popovski, Aalborg (DK); Jung-Min Ro, Seoul (KR); Eun-Taek Lim, Suwon-si (KR); Young-Kwon Cho, Suwon-si (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 907 days.

(21) Appl. No.: 11/654,177

(22) Filed: Jan. 17, 2007

(65) Prior Publication Data

US 2007/0237167 A1   Oct. 11, 2007

(30) Foreign Application Priority Data

Jan. 17, 2006   (KR) .................. 10-2006-0004984

(51) Int. Cl.
*H04Q 7/00* (2006.01)

(52) U.S. Cl. .................. 370/328; 370/337; 455/101

(58) Field of Classification Search .................. 370/329, 370/310
See application file for complete search history.

(56) References Cited

U.S. PATENT DOCUMENTS

| 6,286,122 | B1 * | 9/2001 | Alanara | 714/781 |
| 6,473,467 | B1 | 10/2002 | Wallace et al. | |
| 7,454,000 | B1 * | 11/2008 | Henderson | 379/142.04 |
| 2002/0163897 | A1 | 11/2002 | Horie | |
| 2003/0204717 | A1 * | 10/2003 | Kuehnel | 713/150 |
| 2003/0228850 | A1 * | 12/2003 | Hwang | 455/101 |
| 2005/0232156 | A1 | 10/2005 | Kim et al. | |
| 2006/0126577 | A1 * | 6/2006 | Yano et al. | 370/337 |
| 2006/0203766 | A1 * | 9/2006 | Kim et al. | 370/328 |

FOREIGN PATENT DOCUMENTS

| KR | 102003000748 | 1/2003 |
| KR | 102003006213 | 7/2003 |
| KR | 102005008152 | 8/2005 |

* cited by examiner

*Primary Examiner* — Phuoc Doan
(74) *Attorney, Agent, or Firm* — The Farrell Law Firm, P.C.

(57) ABSTRACT

A method is provided for transmitting/receiving data in a communication system. The method includes measuring, by a Mobile Station (MS), states of channels which are allocated in a scheme prearranged with a Base Station (BS), and encoding measured channel state information in a scheme corresponding to an allocation scheme of the allocated channels; and configuring a message including the encoded channel state information, and transmitting the configured message to the BS.

17 Claims, 4 Drawing Sheets

METHOD FOR TRANSMITTING/RECEIVING DATA IN COMMUNICATION SYSTEM

PRIORITY

This application claims priority to an application filed in the Korean Industrial Property Office on Jan. 17, 2006 and assigned Serial No. 2006-004984, the contents of which are incorporated herein by reference.

BACKGROUND OF THE INVENTION

1. Field of the Invention

The present invention relates to a communication system, and more particularly to a data transmission/reception method for improving the use efficiency of resources in a communication system which transmits/receives data using limited resources.

2. Description of the Related Art

In a next-generation communication system, much research has been made to provide users with high-speed services with various qualities of service (QoS). Particularly, in the current next generation communication system, research is being vigorously pursued to support high-speed services for broadband wireless access (BWA) communication systems such as wireless local area network (WLAN) communication systems and wireless metropolitan area network (WMAN) communication systems by ensuring both mobility and various QoSs. A typical communication system for this purpose is the IEEE (Institute of Electrical and Electronics Engineers) 802.16a/d communication system and the IEEE 802.16e communication system.

The IEEE 802.16a/d and IEEE 802.16e communication systems, each of which is one of the BWA communication systems, are communication systems which apply an Orthogonal Frequency Division Multiplexing (OFDM)/Orthogonal Frequency Division Multiple Access (OFDMA) scheme in order to support a broadband transmission network to a physical channel of the WMAN system. The IEEE 802.16a/d communication system currently considers only the fixed state of a subscriber station (SS), that is, a state in which mobility of the SS is not taken into account at all, and considers only a single cell structure. In contrast with this, the IEEE 802.16e communication system reflects the mobility of an SS in addition to the characteristics of the IEEE 802.16a/d communication system. Hereinafter, the SS having mobility will be referred to as a mobile station (MS).

The IEEE 802.16e communication system, one of the BWA communication systems, has a frame structure, a base station (BS) of the system efficiently allocates resources of each frame, which are to be used by MSs, to the MSs, and the BS transmits resource allocation information to the MSs through MAP messages. Of the MAP messages, an MAP message used for transmitting downlink resource allocation information is a downlink-MAP (DL-MAP) message, and an MAP message used for transmitting uplink resource allocation information is an uplink-MAP (UL-MAP) message.

If the BS transmits downlink resource allocation information and uplink resource allocation information to the MSs through DL-MAP and UL-MAP messages in this way, the MSs can detect the positions of resources allocated thereto and control information of data to be received by the MSs themselves by decoding the DL-MAP and UL-MAP messages transmitted from the BS. By detecting the resource allocation positions and the control information, the MSs can transmit/receive data over the downlink and uplink.

The MAP message is configured in different MAP information element (IE) formats according to whether it is a DL-MAP message or a UL-MAP message and according to the type of a data burst, that is, according to whether a data burst is a data burst to which a hybrid automatic repeat request (HARQ) scheme is applied (HARQ data burst), a data burst to which the HARQ scheme is not applied (Non-HARQ data burst), or control information. Thus, the MSs must be previously aware of each MAP IE format in order to decode each MAP IE, and can discern each MAP IE from others by using a downlink interval usage code (DIUC) in the case of a downlink and by using an uplink interval usage code (UIUC) in the case of an uplink.

Further, as stated above, in the BWA communication system, data transmission is performed on a frame-by-frame basis, and each frame is divided into a downlink data transmission sub-frame and an uplink data transmission sub-frame. Here, the data transmission sub-frame is configured in a two-dimensional arrangement of frequency domain vs. time domain, and each two-dimensional arrangement is a slot corresponding to an allocation unit. That is, the frequency domain is divided in units of sub-channels, each of which is a bundle of sub-carriers, and the time domain is divided in units of symbols. Therefore, the slot represents a symbol region occupied by one sub-channel. Each slot is allocated to only one MS among MSs existing in one cell, and a set of slots allocated to the respective MSs existing in one cell is a burst. In this way, radio resources in the communication system are allocated in such a manner that the respective MSs use divided slots.

FIG. 1 illustrates the frame structure of a common IEEE 802.16e communication system.

Referring to FIG. 1, a frame is represented by symbols and sub-channels in time and frequency domains, respectively. The y-axis denotes a sub-channel which is a resource unit of frequency, and includes an N number of sub-channels from an s-th sub-channel to an (s+L)-th sub-channel. The x-axis denotes an OFDM symbol which is a resource unit of time, and includes an M number of downlink OFDM symbols from a k-th OFDM symbol to a (k+M)-th OFDM symbol and an N number of uplink OFDM symbols from a (k+M+1)-th OFDM symbol to a (k+M+N)-th OFDM symbol. Further, the frame includes a downlink sub-frame 100 and an uplink sub-frame 150, and a transmitter time guard (TTG) interval exists between the downlink sub-frame 100 and the uplink sub-frame 150.

The downlink sub-frame 100 includes a preamble field 111, a frame control header (FCH) field 113, a DL-MAP message field 115, a UL-MAP message field 117, and a plurality of downlink burst (DL-Burst) fields, that is, a first downlink burst field (DL-Burst #1) 119-1, a second downlink burst field (DL-Burst #2) 119-2, a third downlink burst field (DL-Burst #3) 119-3, a fourth downlink burst field (DL-Burst #4) 119-4, a fifth downlink burst field (DL-Burst #5) 119-5, a sixth downlink burst field (DL-Burst #6) 119-6, a seventh downlink burst field (DL-Burst #7) 119-7 and a eighth downlink burst field (DL-Burst #8) 119-8. The uplink sub-frame 150 includes a plurality of uplink burst (UL-Burst) fields, that is, a first uplink burst field (UL-Burst #1) 151-1, a second uplink burst field (UL-Burst #2) 151-2, a third uplink burst field (UL-Burst #3) 151-3, a fourth uplink burst field (UL-Burst #4) 151-4, a fifth uplink burst field (UL-Burst #5) 151-5, a sixth uplink burst field (UL-Burst #6) 151-6 and a seventh uplink burst field (UL-Burst #7) 151-7.

A transmission/reception period, that is, a synchronization signal for synchronization acquisition between a BS and MSs, which is called a preamble sequence, is transmitted through the preamble field 111. Further, basic information about sub-channels, ranging, modulation schemes, etc. is transmitted through the FCH field 113. A DL-MAP message is transmitted through the DL-MAP message field 115, and a UL-MAP message is transmitted through the UL-MAP message field 117.

The DL-MAP message field 115 includes a plurality of IEs, and the respective IEs include information on the downlink burst fields corresponding thereto, that is, information on the DL-Burst #1 119-1, information on the DL-Burst #2 119-2, information on the DL-Burst #3 119-3, information on the DL-Burst #4 119-4, information on the DL-Burst #5 119-5, information on the DL-Burst #6 119-6, information on the DL-Burst #7 119-7 and information on the DL-Burst #8 119-8.

The UL-MAP message field 117 includes a plurality of IEs, and the respective IEs include information on the uplink burst fields corresponding thereto, that is, information on the UL-Burst #1 151-1, information on the UL-Burst #2 151-2, information on the UL-Burst #3 151-3, information on the UL-Burst #4 151-4, information on the UL-Burst #5 151-5, information on the UL-Burst #6 151-6 and information on the UL-Burst #7 151-7. Each corresponding data burst is transmitted through the DL-Burst #1 119-1 to the DL-Burst #8 119-8, and each corresponding uplink data burst is transmitted through the UL-Burst #1 151-1 to the UL-Burst #7 151-7.

An MS receives the DL-MAP message and the UL-MAP message, and decodes the received DL-MAP and UL-MAP messages to thereby detect an IE indicating information on resources allocated thereto, that is, a MAP IE. Through the detected MAP IE, the MS can find out a resource region allocated thereto. Here, each IE included in the DL-MAP message represents the allocated region by indicating its starting points and sizes in time and frequency domains, and each IE included in the UL-MAP message represents the allocated region by indicating the starting point and size of a multiple of a slot. Here, the slot refers to a minimum resource allocation unit consisting of sub-channels and symbols.

Therefore, when the MS receives the DL-MAP message, it successively decodes MAP IEs included therein. If the MS detects a MAP IE allocated thereto in the course of decoding, it can find out the position of resources allocated thereto by using position information of the detected MAP IE. Further, when the MS receives the UL-MAP message, the MS adds regions occupied by all MAP IEs before a MAP IE allocated to the MS is detected, and the position a MAP IE allocated to the MS is determined as the position of a region next to the added regions.

In this way, the IEEE 802.16e communication system allocates sub-channels to respective MSs in an uplink/downlink through a sub-channel allocation scheme using an adaptive modulation and coding (AMC) scheme (AMC sub-channel allocation scheme). Here, the AMC scheme is a scheme in which a modulation technique and a coding technique is adaptively changed according to wireless environments in order to improve data transmission efficiency, and a detailed description thereof will be omitted because it is well known in the art. Further, if the MS receives the UL-MAP message, it ascertains allocation information of a channel state information channel (CSICH) for transmitting its channel state information (CSI) to a BS, and transmits the CSI to the BS over the CSICH.

FIG. 2 illustrates a scheme in which an MS transmits its CSI to a BS over a CSICH in the IEEE 802.16e communication system.

Referring to FIG. 2, in the scheme of transmitting the CSI of an MS to a BS over an CSICH in the IEEE 802.16e communication system, each MS selects five sub-channels 201, 203, 205, 207, 209 having good channel conditions from among sub-channels allocated thereto, and transmits channel state values carried in the indexes of the selected sub-channels 201, 203, 205, 207, 209 to the BS. Neither information on the non-selected sub-channels is carried in their indexes nor is the information transmitted. More specifically, each MS measures channel states with respect to the BS, for example, measures carrier to interference and noise ratio (CINR) of respective sub-channels, selects five sub-channels 201, 203, 205, 207, 209 having good channel conditions from among the measured sub-channels, and then transmits the CSI of the selected five sub-channels 201, 203, 205, 207, 209 to the BS over the CSICH. However, the MS does not transmit the CSI of non-selected sub-channels.

With regard to this, when the CSI of the selected five sub-channels 201, 203, 205, 207, 209 are transmitted to the BS, there is a problem in that resources required for transmitting the CSI increase. Particularly, the greater the number of MSs provided with communication services from the BS, the greater the amount of data to be transmitted to the BS, that is, the greater the amount of feed back information, which results in lowering of the use efficiency of resource.

SUMMARY OF THE INVENTION

Accordingly, the present invention has been made to solve at least the above-mentioned problems occurring in the prior art, and an object of the present invention is to provide a method for transmitting/receiving data in a communication system.

A further object of the present invention is to provide a data transmission/reception method for feedback information to a BS in a communication system.

A further object of the present invention is to provide a data transmission/reception method for transmitting CSI to a BS in a communication system.

In order to accomplish these objects, in accordance with one aspect of the present invention, there is provided a method for transmitting/receiving data in a communication system. The method includes measuring, by a mobile station (MS), states of channels which are allocated in a scheme prearranged with a base station (BS), and encoding measured channel state information in a scheme corresponding to an allocation scheme of the allocated channels; and configuring a message including the encoded channel state information, and transmitting the configured message to the BS.

In accordance with another aspect of the present invention, there is provided a method for transmitting/receiving data in a communication system. The method includes detecting, by a base station (BS), channel state information included in a first field of a channel state information message when the BS receives the channel state information message including channel state information from a mobile station (MS), and ascertaining encoding information of the channel state information; and decoding the channel state information with a decoding scheme corresponding to the ascertained encoding information, and demodulating the channel state information message.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
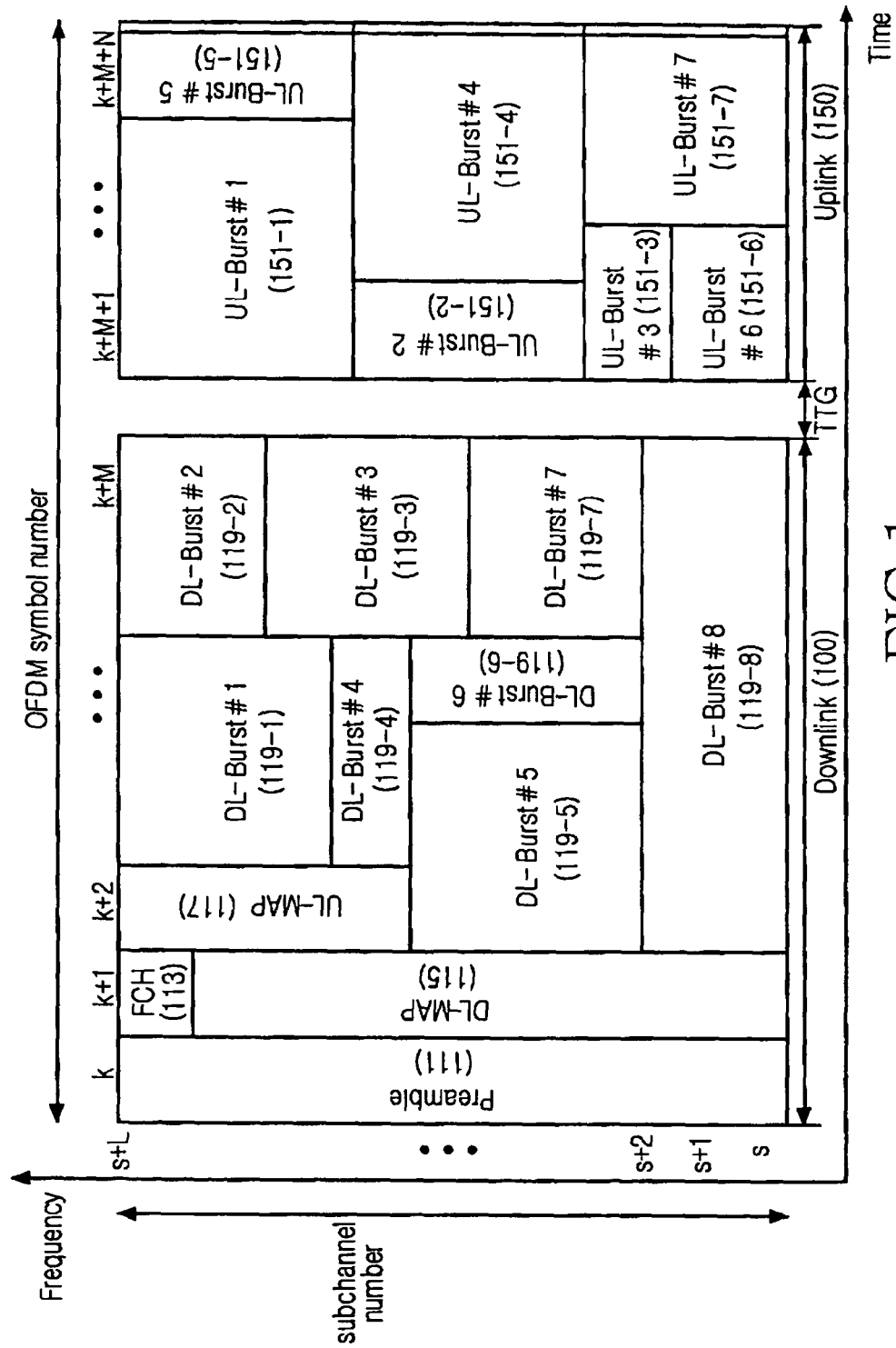
FIG. 1 illustrates a frame structure of a common IEEE 802.16e communication system.
Figure 2:
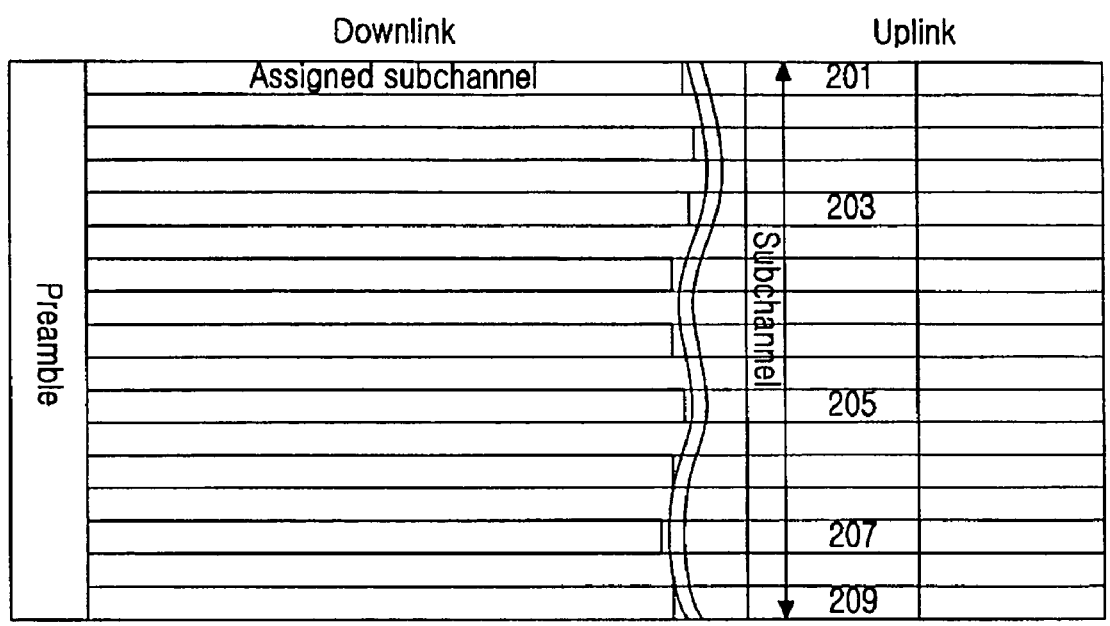
FIG. 2 illustrates a scheme in which an MS transmits CSI to a BS.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the present invention.

Although the IEEE (Institute of Electrical and Electronics Engineers) 802.16 communication system, one of broadband wireless access (BWA) communication systems, will be described by way of example in the present invention, a data transmission/reception method of the present invention may be applied to other communication systems.

Further, the present invention provides a method for transmitting/receiving data between a transmitter controlling one cell, for example, a base station (BS), and a receiver provided with communication services from the BS, for example, an subscriber station (SS), being both fixed and having mobility (that is, a mobile station (MS)) in a communication system. The present invention to be described below provides a method for transmitting/receiving information on a channel state between an MS and a BS in a communication system. At this time, the MS measures a channel state with the BS, for example, a carrier to interference and noise ratio (CINR) from the BS or the strength of a received signal, and transmits channel state information (CSI) corresponding to the measured channel state to BS over a channel state information channel (CSICH) which is a channel allocated for CSI transmission.

Herein, although data transmission/reception in uplink of a communication system, that is, an operation in which an MS feeds back CSI to a BS over a CSICH, will be illustratively described in the present invention, the present invention may be applied to general data transmission/reception in an uplink and downlink, that is, a method for transmitting/receiving data between a BS and an MS over a sub-channel.

Further, the present invention provides a data transmission/reception method for improving the use efficiency of resources by reducing the amount of data transmission in a communication system. Further, the present invention provides a data transmission/reception method in which, if data to be transmitted is generated, the data to be transmitted is encoded in a scheme corresponding to a channel allocation scheme of channels previously allocated for data transmission, and the encoded data is transmitted/received. The IEEE 802.16 communication system according to the present invention to be described below, one of BWA communication systems, allocates sub-channels to respective MSs in an uplink/downlink through a sub-channel allocation scheme using an adaptive modulation and coding (AMC) scheme, that is, an AMC sub-channel allocation scheme. Here, the AMC scheme is a scheme in which a modulation technique and a coding technique are adaptively changed according to wireless environments in order to improve data transmission efficiency. In the following description of the present invention, a data transmission/reception method is provided, in which the amount of data transmission is reduced and thus the use efficiency of resources is improved by encoding data to be transmitted, for example, CSI in a scheme corresponding to an AMC level of the AMC sub-channel allocation scheme, and transmitting the encoded CSI to a BS.

In addition, the IEEE 802.16 communication system, a BWA communication system, has a frame structure, a BS of the system efficiently allocates resources of each frame, which are to be used by MSs, to the MSs, and the BS transmits resource allocation information to the MSs through MAP messages. Of the MAP messages, a MAP message used for transmitting downlink resource allocation information is a downlink-MAP (DL-MAP) message, and a MAP message used for transmitting uplink resource allocation information is an uplink-MAP (UL-MAP) message. If the BS transmits downlink resource allocation information and uplink resource allocation information to the MSs through DL-MAP and UL-MAP messages in this way, the MSs can detect the positions of resources allocated thereto and control information of data to be received by the MSs themselves by decoding the DL-MAP and UL-MAP messages transmitted from the BS. By detecting the resource allocation positions and the control information, the MSs can transmit/receive data over the downlink and uplink.

Reference will now be made in detail to a way in which an MS transmits CSI to a BS in a communication system according to the present invention with reference to Table 1. Table 1 as presented below shows the format of a message including CSI in a communication system according to the present invention.

TABLE 1

| field No. | field size | contents |
|---|---|---|
| 1 | 1 bit | 0 = Indicator/Position code, 1 = Differential/Grouped code |
| 2 | M bits | AMC level |
| 3 | variable bits | CSI |

As shown in Table 1, the first field (field #1) of 1 bit is a field including encoding information of CSI. The first field (field #1) includes "0" if CSI to be transmitted is encoded with an Indicator/Position code, and includes "1" if CSI to be transmitted is encoded with an Differential/Grouped code. Here, the Indicator/Position code and the Differential/Grouped code are determined corresponding to the number of AMC levels in an AMC sub-channel allocation scheme used in the communication system. More specially, an MS encodes the CSI with the Indicator/Position code and then transmits the encoded CSI to a BS if the number of AMC levels is one, and the MS encodes the CSI with the Differential/Grouped code and then transmits the encoded CSI to the BS if the number of AMC levels is two or more.

In Table 1, the second field (field #2) of M bits is a field including AMC level information. When there are one or more AMC levels, the second field (field #2) includes information corresponding to each AMC level in a bitmap scheme. Further, the third field (field #3) is a field including the CSI code of a sub-channel corresponding to each AMC level. The CSI of a sub-channel corresponding to the AMC level included in the second field (field #2) is encoded corresponding to the encoding information included in the first field (field #1), and then the encoded CSI is included in the third field (field #3).

Hereinafter, a case where the number of AMC levels is one, in other words, a case of encoding CSI to be transmitted with an Indicator/Position code, will be described first, and then a case where the number of AMC levels is two or more, in other words, a case of encoding CSI to be transmitted with a Differential/Grouped code, will be described.

First of all, a description will be given of the case where the number of AMC levels is one, in other words, the case of encoding CSI with an Indicator/Position code and transmitting the encoded CSI to a BS, with reference to Tables 2 and 3. Here, Table 2 shows the format of a message including CSI in the case where CSI to be transmitted is encoded with an Indicator code, and Table 3 shows the format of a message including CSI in the case where CSI to be transmitted is encoded with a Position code. Further, for convenience of explanation, such cases will be described on the assumption that CSI of sub-channels is "5 7 6 7 2 1 2 6", and channel information, that is, CSI of sub-channels having an AMC level of a threshold, for example, an AMC level of 5, is encoded with an Indicator/Position code and the encoded CSI is transmitted to a BS, as shown in Tables 2 and 3.

TABLE 2

| field No. | field size | contents |
|---|---|---|
| 1 | 1 bit | 0 |
| 2 | 3 bits | 101 |
| 3 | 8 bits | 10000000 |

As shown in Table 2, since the first field (field #1) of 1 bit includes "0", it indicates that CSI to be transmitted is encoded with an Indicator code. Further, since the second filed (field #2) of 3 bits includes "101", it indicates that channel information, that is, CSI of sub-channels having an AMC level of 5 is encoded with the Indicator code and the encoded CSI is transmitted to a BS.

Here, since the CSI is CSI corresponding to eight sub-channels, the third field (field #3) in Table 2 has 8 bits. Further, since the first sub-channel among the eight sub-channels has an AMC level of 5, CSI of the first sub-channel in CSI of the eight sub-channels is encoded with the Indicator code. Thus, the third field (field #3) includes "10000000" according to a bitmap scheme, and the CSI is encoded with the Indicator code and is transmitted through a message having the format as shown in Table 2.

TABLE 3

| field No. | Field size | contents |
|---|---|---|
| 1 | 1 bit | 0 |
| 2 | 3 bits | 101 |
| 3 | 3 bits | 000 |
| 4 | 3 bits | 000 |

As shown in Table 3, since the first field (field #1) of 1 bit includes "0", it indicates that CSI to be transmitted is encoded with a Position code. Further, since the second field (field #2) of 3 bits includes "101", it indicates that channel information, that is, CSI of sub-channels having an AMC level of 5 is encoded with the Position code and the encoded CSI is transmitted to a BS. That is, the first and second fields (fields #1 and #2) in Table 3 are the same as those in Table 2.

Here, since the CSI is CSI corresponding to eight sub-channels, the third field (field #3) in Table 3 has 3 bits. Further, since the first sub-channel among the eight sub-channels has an AMC level of 5, the number of sub-channels having an AMC of 5 is one. Thus, the third field (field #3) includes "000", and the fourth field (field #4), which represents the indexes of sub-channels having an AMC level of 5, includes "000". If it is assumed that CSI of sub-channels having an AMC level of 7 is transmitted, the number of sub-channels having an AMC level of 7 is two because the second and fourth sub-channels among the eight sub-channels have an AMC level of 7. Thus, the third field (field #3) includes "001", and the fourth field (field #4), which represents the indexes of sub-channels having an AMC level of 7, includes "001". That is, the third field (field #3) means the number of sub-channels which, among the eight sub-channels, have CSI corresponding to an AMC level to be transmitted, and the fourth field (field #4) means the indexes of sub-channels having CSI corresponding to the AMC level.

In this way, when CSI is encoded with an Indicator code and the encoded CSI is transmitted through a message having the format as shown in Table 2 and when CSI is encoded with a Position code and the encoded CSI is transmitted through a message having the format as shown in Table 3, the first and second fields (fields #1 and #2) of the respective messages are the same, but the third and fourth fields (field #3 and #4) of the respective message are different. Thus, resources required in the case of encoding CSI to be transmitted with an Indicator code is defined by the following Equation (1), and resources required in the case of encoding CSI to be transmitted with a Position code is defined by the following Equation (2):

$$R_i = 1 + M + N_{sch} \quad (1)$$

$$R_p = 1 + M + 2\log_2 N_{sch} \quad (2)$$

where, $R_i$ denotes the resources required in the former case, $R_p$ denotes the resources required in the latter case, M denotes the total number of bits required for representing the AMC level, and $N_{sch}$ denotes the total number of sub-channels.

Next, a description will be given of the case where the number of AMC levels is two or more, in other words, the case of encoding CSI with a Differential/Grouped code and transmitting the encoded CSI to a BS, with reference to Tables 4 and 5. Here, Table 4 shows the format of a message including CSI in the case where CSI to be transmitted is encoded with a Differential code, and Table 5 shows the format of a message including CSI in the case where CSI to be transmitted is encoded with a Grouped code. Further, for convenience of explanation, such cases will be described on the assumption that CSI of sub-channels is "5 3 6 7 2 1 7 4 6 3 5 2 4 4 7 6", and channel information of sub-channels having an AMC level of a threshold or more, for example, an AMC level of 5 or more, that is, channel information of sub-channels having AMC levels of 5, 6 and 7, is encoded with a Differential/Grouped code and the encoded CSI is transmitted to a BS, as shown in Tables 4 and 5.

TABLE 4

| field No. | field size | contents |
|---|---|---|
| 1 | 1 bit | 1 |
| 2 | 8 bits | 11100000 |
| 3 | 29 bits | 1011001010100011 (3-1) |
|  |  | 00110010 (3-2) |
|  |  | 01101 (3-3) |

As shown in Table 4, since the first field (field #1) of 1 bit includes "1", it indicates that CSI to be transmitted is encoded with a Differential code. Further, since the number of AMC levels from 1 to 8 is eight, the second filed (field #2) has 8 bits. Since the second field (field #2) of 8 bits includes "11100000", it indicates that that channel information, that is, CSI of sub-channels having AMC levels of 5, 6 and 7 is encoded with the Differential code and the encoded CSI is transmitted to a BS. Further, the third field (field #3) of 29 bits encodes CSI corresponding to information included in the first and second fields (fields #1 and #2) with the Differential code and transmits the encoded CSI to a BS.

More specially, the third field (field #3) includes "1011001010100011" according to a bitmap scheme in which, in CSI of all sub-channels, for example, in the previously assumed CSI "5 3 6 7 2 1 7 4 6 3 5 2 4 4 7 6", CSI of sub-channels having AMC levels of 5, 6 and 7 is represented by "1". That is, the first region 3-1 of the third field (field #3) includes CSI of all sub-channels, in which CSI of sub-channels corresponding to the AMC levels included in the second field (field #2) is represented differently from that of sub-channels corresponding to other AMC levels, for example, by using "1". Subsequently, the third field (field #3) includes "00110010" which represents CSI of sub-channels, which have the most AMC level among the CSI of sub-channels corresponding to the AMC levels included in the second field (field #2), by "1". That is, the second region 3-2 of the third field (field #3) includes information in which, among 8 bits corresponding to AMC levels of 5, 6 and 7, that is, bits represented by "1" in "1011001010100011" included in the first region 3-1, CSI of sub-channels having the most AMC level of 7 is represented by "1".

Therefore, the first region 3-1 of the third field (field #3) includes CSI of all sub-channels, and the second region 3-2 of the third field (field #3) includes CSI of sub-channels having the most AMC level in the CSI of all sub-channels, that is, CSI of sub-channels which have an AMC level corresponding to the most significant bit (MSB) of information included in the second field (field #2).

Further, the third field (field #3) also includes "01101" which represents CSI of sub-channels having an AMC level next to the most AMC level, for example, CSI of sub-channels having an AMC level of 6, by "1". That is, the third region 3-3 of the third field (field #3) includes information in which, among 5 bits corresponding to AMC levels of 5 and 6, that is, bits represented by "0" in "00110010" included in the second region 3-2, CSI of sub-channels having an AMC level of 6 is represented by "1". Here, since bits represented by "0" in "00110010" indicate CSI of sub-channels having an AMC level of 5, the CSI of sub-channels having an AMC level of 5 need not be separately represented in CSI to be transmitted. In this way, in CSI of all sub-channels, CSI of sub-channels having AMC levels of a threshold or more is encoded with a Differential code and the encoded CSI is transmitted through a message having the format as shown in Table 4.

TABLE 5

| field No. | field size | Contents |
|---|---|---|
| 1 | 1 bit | 1 |
| 2 | 3 bits | 101 |
| 3 | 30 bits | 10 0 101 111 0 0 111 0 101 0 10 0 0 0 111 101 |

As shown in Table 5, since the first field (field #1) of 1 bit includes "1", it indicates that CSI to be transmitted is encoded with a Grouped code. Further, since the second field (field #2) of 3 bits includes "101", it indicates that channel information, that is, CSI of sub-channels having an AMC level of 5 or more is encoded with the Grouped code and the encoded CSI is transmitted to a BS. Here, the AMC level information included in the second field (field #2) denotes a threshold of the least AMC level in the encoded CSI to be transmitted, and thus the second field (field #2) indicates that CSI of sub-channels having an AMC level of 5 or more, that is, CSI of sub-channels having AMC levels of 5, 6 and 7, is encoded with the Grouped code and the encoded CSI is transmitted to a BS. Further, the third field (field #3) of 30 bits encodes CSI corresponding to information included in the first and second fields (fields #1 and #2) with the Grouped code and transmits the encoded CSI to a BS.

More specifically, in CSI of all sub-channels, for example, in the previously assumed CSI "5 3 6 7 2 1 7 4 6 3 5 2 4 4 7 6", the third field (field #3) adds "1" to the front of CSI of sub-channels having AMC levels of 5, 6 and 7, that is, CSI to be encoded and transmitted, and substitutes CSI of sub-channels, which is not to be encoded and transmitted, by "0". Further, the third field (field #3) includes "0" when CSI to be transmitted corresponds to CSI of sub-channels having an AMC level of 5, includes "01" when CSI to be transmitted corresponds to CSI of sub-channels having an AMC level of 6, and includes "11" when CSI to be transmitted corresponds to CSI of sub-channels having an AMC level of 7. Consequently, the third field (field #3) includes "10 0 101 111 0 0 111 0 101 0 10 0 0 0 111 101" with respective to the previously assumed CSI "5 3 6 7 2 1 7 4 6 3 5 2 4 4 7 6". In this way, in CSI of all sub-channels, CSI of sub-channels having AMC levels of a threshold or more is encoded with a Grouped code and the encoded CSI is transmitted through a message having the format as shown in Table 5.

As stated above, when CSI of sub-channels is encoded with a Differential code and the encoded CSI is transmitted through a message having the format as shown in Table 4 and when CSI is encoded with a Grouped code and the encoded CSI is transmitted through a message having the format as shown in Table 5, the first fields (field #1) in the respective message formats are the same. Further, resources required in the case of encoding CSI to be transmitted with a Differential code have 38 bits, and resources required in the case of encoding CSI to be transmitted with a Grouped code have 34 bits. Thus, in the above-mentioned embodiment of the present invention, resources can be more efficiently used when CSI to be transmitted is encoded with a Grouped code.

Figure 3:
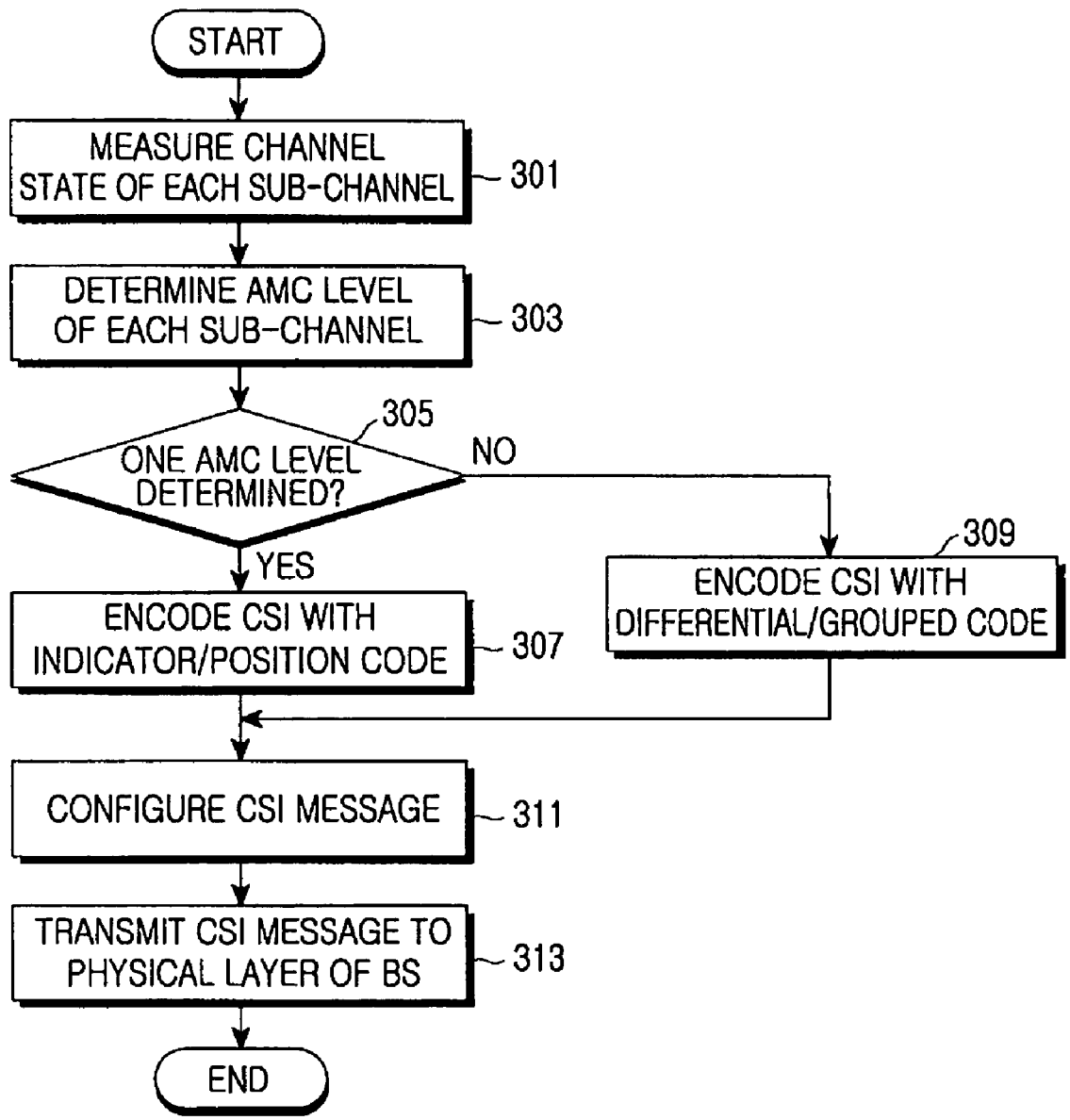
FIG. 3 is a flowchart illustrating an operation procedure of an MS in a communication system in accordance with the present invention.

FIG. 3 illustrates the operation procedure of an MS in a communication system according to the present invention.

Referring to FIG. 3, in step 301, the MS measures the channel state of each sub-channel between the MS and a BS by measuring a channel state with the BS, for example, a received CINR from the BS or the strength of a received signal. Next, in step 303, the MS determines the AMC level of each sub-channel, the channel state of which has been measured, and then proceeds to step 305. Here, in order to improve the efficiency of data transmission, the AMC level is determined as an optimal level by adaptively changing modulation and coding techniques according to the system communication environment, as already mentioned above.

In step 305, the number of the determined AMC levels of the sub-channels is determined. That is, the MS determines whether the number of the AMC levels is one. If a result of the determination in step 305 shows that the number of the AMC levels is one, the MS proceeds to step 307, and encodes the CSI, that is, CSI of each sub-channel, which has been measured in step 301, with an Indicator/Position code. In contrast with this, if a result of the determination in step 305 shows that the number of the AMC levels is two or more, the MS proceeds to step 309, and encodes the CSI, that is, CSI of each sub-channel, which has been measured in step 301, with a Differential/Grouped code.

After the CSI is encoded with the Indicator/Position code or the Differential/Grouped code in step 307 or 309, the MS proceeds to step 311, and configures a CSI message including the encoded CSI. With regard to this, since a procedure of encoding CSI with an Indicator/Position code and configuring a CSI message has been already described in detail with reference to Tables 2 and 3, a detailed description thereof will be omitted herein. Further, since a procedure of encoding CSI with a Differential/Grouped code and configuring a CSI message has been already described in detail with reference to Tables 4 and 5, a detailed description thereof will also be omitted herein. That is, the MS encodes the CSI with the Indicator/Position code or the Differential/Grouped code, configures a message including the encoded CSI by using any one of the formats shown in Tables 2, 3, 4 and 5, and then proceeds to step 313. In step 313, the MS transmits the configured message to a BS through a physical layer.

Hereinafter, as an example, a description will be given of a procedure in which the channel state, that is, CSI of each sub-channel, which is measured in step 301, is encoded using the format shown in Table 4, that is, with the Differential code and the encoded CSI is transmitted to a BS.

First, the MS measures the channel state of each sub-channel and determines the AMC level of each measured sub-channel. Here, since two or more AMC levels are determined as previously assumed, the MS proceeds to step 309, encodes CSI of each sub-channel with the Differential code, and configures a message including the encoded CSI. That is, the MS sets the first field to "1", as shown in Table 4, and thus indicates that the CSI is encoded with the Differential code. Next, the MS sets the determined AMC levels in the second field. When the determined AMC levels are 5, 6 and 7, as shown in Table 4, the MS sets "11100000" in the second field, and thus indicates that the AMC levels are 5, 6 and 7. Further, the MS sets CSI of each measured sub-channel in the first region of the third field by setting the CSI of sub-channels having AMC levels of 5, 6 and 7 to "1" and setting the CSI of sub-channels having the remaining AMC levels to "0".

Next, in the second region of the third field, the MS sets CSI of sub-channels, which correspond to the most AMC level of 7 among bits set to "1" in the first region, to "1", and sets CSI of sub-channels corresponding to the remaining AMC levels, that is, AMC levels of 5 and 6, to "0". Next, in the third region of the third field, the MS sets CSI of sub-channels, which correspond to an AMC level next to the most AMC level, that is, an AMC level of 6, among bits set to "0" in the second region, to "1", and sets CSI of sub-channels corresponding to the remaining AMC levels, that is, an AMC level of 5, to 0". Here, since "0" set in the third region denotes CSI of sub-channels having an AMC level of 5, CSI of sub-channels having AMC levels of 5, 6 and 7 is wholly included in the third field even though the CSI of sub-channels having an AMC level of 5 is not separately represented. After the CSI is encoded with the Differential code in this way, the MS configures a CSI message having the format as shown in Table 4, and transmits the configured CSI message to a physical layer of a BS.

Figure 4:
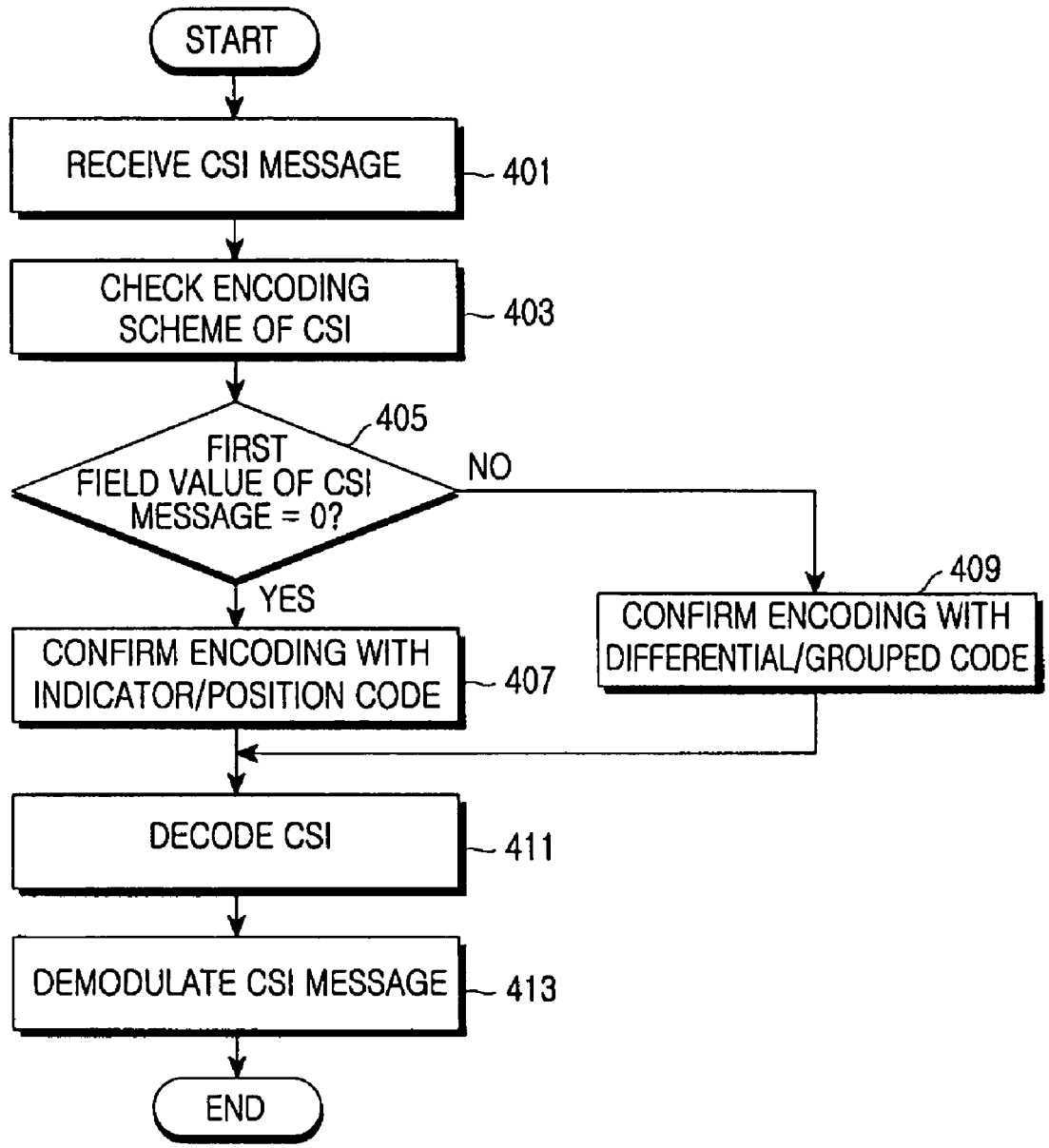
FIG. 4 is flowchart illustrating an operation procedure of a BS in a communication system in accordance with the present invention.

FIG. 4 illustrates the operation procedure of a BS in a communication system according to the present invention.

Referring to FIG. 4, in step 401, the BS receives a CSI message from an MS. The CSI message includes encoded CSI which is generated in such a manner that the MS measures a channel state and encodes the measured channel state, that is, CSI with a code, as mentioned above. In step 403, the BS then checks the encoding scheme of the CSI by detecting information included in the first field of a CSI message format which is any one of the formats shown Tables 2, 3, 4 and 5. That is, as stated above, the BS receives a CSI message including any one of the formats shown in Tables 2, 3, 4 and 5, and checks the encoding scheme of the CSI by detecting encoding information included in the first field of the CSI message format.

Next, in step 405, the BS determines if a bit value included in the detected first field is "0", that is, if the CSI is encoded with an Indicator/Position code. If a result of the determination in step 405 shows that the bit value included in the first field is "0", the BS proceeds to step 407, and confirms that the CSI is encoded with an Indicator/Position code. In contrast with this, if the result of the determination in step 405 shows that the bit value included in the first field is "1", the BS proceeds to step 409, and confirms that the CSI is encoded with a Differential/Grouped code.

After the BS confirms in step 407 or 409 that the CSI is encoded with an Indicator/Position code or a Differential/Grouped code, it proceeds to step 411, and decodes the CSI encoded with a corresponding code. That is, if the BS confirms that the CSI is encoded with an Indicator/Position code, it decodes the CSI in a scheme corresponding to the confirmed result, and then demodulates the CSI message in step 413. Further, if the BS confirms that the CSI is encoded with a Differential/Grouped code, it decodes the CSI in a scheme corresponding to the confirmed result, and then demodulates the CSI message in step 413.

Hereinafter, as an example, a description will be given of a procedure in which the BS decodes a CSI message received in step 401 in the case where a CSI message format included in the CSI message is the format shown in Table 4.

First, if the BS receives a CSI message including CSI, it detects information from the first field of a CSI message format included in the received CSI message. That is, the BS detects a bit value of "1" from the first field of the CSI message format as shown in Table 4, and confirms by the detected bit value that the CSI is encoded with a Differential/Grouped code. The BS then checks AMC levels by detecting information from the second field of the CSI message format included in the received CSI message. Here, the BS confirms that the AMC levels are 5, 6 and 7, as previously assumed, and detects information included in the third field of the CSI message format.

In detecting information included in the third field of the CSI message format, the BS checks CSI of all sub-channels by detecting information included in the first region of the third field, and particularly confirms that CSI of sub-channels corresponding to the AMC levels included in the second field, that is, AMC levels of 5, 6 and 7, is set to "1" and CSI of sub-channels corresponding to the remaining AMC levels is set to "0". The BS then checks CSI of sub-channels corresponding to the most AMC level of 7 by detecting information included in the second region of the third field. Next, the BS confirms that CSI of sub-channels corresponding to an AMC level next to the most AMC level, that is, an AMC level of 6, is set to "1", and CSI of sub-channels corresponding to the remaining AMC level of 5 is set to "0" by detecting information included in the third region of the third field. At this time, the BS confirms CSI of sub-channels corresponding to the AMC level of 5 by checking information set to "0" in the third region of the third field. In this way, the BS receives CSI from the MS by decoding the CSI format, which is included in the received CSI message and corresponds to the format shown in Table 4, and demodulating the CSI message.

According to the present invention as described above, resources can be more efficiently used by encoding data to be transmitted in a prescribed scheme corresponding to a channel allocation scheme. Further, when channel state information is transmitted between an MS and a BS, the channel state of each sub-channel is measured, and the channel state information of the measured sub-channel is encoded in a scheme corresponding to AMC levels before its transmission, so that the use efficiency of resources allocated for the transmission of the channel state information can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting/receiving data by a Mobile Station (MS) in a communication system, the method comprising:
    measuring states of channels which are allocated in a scheme prearranged with a Base Station (BS);
    determining Adaptive Modulation and Coding (AMC) levels of the allocated channels;
    encoding channel state information of channels having an AMC level of a threshold among the measured channel state information with an Indicator/Position code when a number of the determined AMC levels is one, and encoding channel state information of channels having an AMC level of the threshold or more among the measured channel state information with a Differential/Grouped code when the number of the determined AMC levels is at least two; and
    configuring a message including the encoded channel state information, and transmitting the configured message to the BS.

2. The method as claimed in claim 1, wherein configuring the message comprises setting Indicator/Position encoding information of the measured channel state information in a first field of the message, and setting information of the AMC level of the threshold in a second field of the message.

3. The method as claimed in claim 2, wherein configuring the message comprises setting the channel state information of the channels having the AMC level of the threshold in a third field of the message using a bitmap scheme.

4. The method as claimed in claim 2, wherein configuring the message comprises setting a number of the channels having the AMC level of the threshold in a third field of the message, and setting indexes of the channels having the AMC level of the threshold in a fourth field of the message.

5. The method as claimed in claim 1, wherein configuring the message comprises setting Differential/Grouped encoding information of the measured channel state information in a first field of the message, and setting information of the AMC level of the threshold or more in a second field of the message.

6. The method as claimed in claim 5, wherein configuring the message comprises setting the measured channel state information in a first region using a bitmap scheme, setting channel state information of channels corresponding to a most AMC level among the AMC levels using the bitmap scheme in a second region, and setting channel state information of channels corresponding to an AMC level next to the most AMC level using the bitmap scheme in a third region, wherein a third field of the message includes the first region, the second region and the third region, and is successively set.

7. The method as claimed in claim 6, wherein setting channel state information of channels corresponding to the AMC level next to the most AMC level comprises not setting channel state information of channels corresponding to a least AMC level among the AMC levels.

8. The method as claimed in claim 1, wherein configuring the message comprises setting Differential/Grouped encoding information of the measured channel state information in a first field of the message, and setting information of a least AMC level among AMC levels of the threshold or more in a second field of the message.

9. The method as claimed in claim 8, wherein configuring the message comprises setting channel state information of channels corresponding to the AMC levels to a group bit, which is grouped by two or more bits, in a third field of the message.

10. The method as claimed in claim 9, wherein setting channel state information to the group bit comprises setting a same value as a most significant bit of the group bit, and setting the channel state information of channels corresponding to the AMC levels to remaining bits except the most significant bit.

11. The method as claimed in claim 9, wherein configuring the message comprises setting channel state information of channels not corresponding to the AMC levels to one bit, and setting the measured channel state information to the one bit and the most significant bit of the group bit in the third field of the message.

12. The method as claimed in claim 1, wherein measuring states of channels comprises measuring one of a carrier to interference and noise ratio (CINR) and strength of a received signal.

13. The method as claimed in claim 1, wherein resources required in case of encoding the channel state information of the channels having the AMC level of the threshold with the Indicator code is defined by:

$$R_i = 1 + M + N_{sch}$$

where $R_i$ denotes the resources, M denotes a total number of bits required for representing the AMC level of the threshold, and $N_{sch}$ denotes a total number of channels.

14. The method as claimed in claim 1, wherein resources required in case of encoding the channel state information of the channels having the AMC level of the threshold with the Position code is defined by:

$$R_p = 1 + M + 2\log_2 N_{sch}$$

where $R_p$ denotes the resources, M denotes a total number of bits required for representing the AMC level of the threshold, and $N_{sch}$ denotes a total number of channels.

15. A method for transmitting/receiving data by a Base Station (BS) in a communication system, the method comprising:
    detecting channel state information included in a first field of a channel state information message when the BS receives the channel state information message including channel state information from a Mobile Station (MS), ascertaining whether an encoding scheme of the channel state information corresponds to encoding with an Indicator/Position code for encoding channel state information of channels having an Adaptive Modulation and Coding (AMC) level of a threshold or encoding with a Differential/Grouped code and encoding channel state information of channels having an AMC level of the threshold or more, using the detected channel state information; and decoding the channel state information with a decoding scheme corresponding to the ascertained encoding scheme, and demodulating the channel state information message.

16. The method as claimed in claim 15, wherein resources required in case of encoding the channel state information of the channels having the AMC level of the threshold with the Indicator code is defined by:

$$R_i = 1 + M + N_{sch}$$

where $R_i$ denotes the resources, M denotes a total number of bits required for representing the AMC level of the threshold, and $N_{sch}$ denotes a total number of channels.

17. The method as claimed in claim 15, wherein resources required in case of encoding the channel state information of the channels having the AMC level of the threshold with the Position code is defined by:

$$R_p = 1 + M + 2 \log_2 N_{sch}$$

where $R_p$ denotes the resources, M denotes a total number of bits required for representing the AMC level of the threshold, and $N_{sch}$ denotes a total number of channels.

* * * * *